United States Patent

[11] 3,581,010

[72] Inventor Toshio Kobayashi
Yokohama-shi, Japan

[21] Appl. No. 682,807
[22] Filed Nov. 14, 1967
[45] Patented May 25, 1971
[73] Assignee Fujitsu Limited
Kawasaki, Japan
[32] Priority Nov. 18, 1966
[33] Japan
[31] 41-76012

[54] FRAME SYNCHRONIZATION SYSTEM FOR SYNCHRONIZING THE FRAME OF A DIGITAL SIGNAL TRANSMISSION
6 Claims, 15 Drawing Figs.

[52] U.S. Cl. .......... 178/69.5, 179/15
[51] Int. Cl. .......... H04l 7/08
[50] Field of Search .......... 178/69.5, 69.5 (F), 50; 325/325; 179/15 BS; 328/72, 74, 75, 179, 55; 307/269; 340/172.5

[56] References Cited

UNITED STATES PATENTS

| | | | |
|---|---|---|---|
| 2,979,565 | 4/1961 | Zarcone | 178/50 |
| 3,052,875 | 9/1962 | Heberling | 178/69.5 |
| 3,065,303 | 11/1962 | Kaneko | 179/15 |
| 3,069,504 | 12/1962 | Kaneko | 179/15 |
| 3,144,515 | 8/1964 | Kaneko | 179/15 |

*Primary Examiner*—Robert L. Griffin
*Assistant Examiner*—John C. Martin
*Attorneys*—Curt M. Avery, Arthur E. Wilfond, Herbert L. Lerner and Daniel J. Tick

ABSTRACT: A digital signal pulse train is supplied to a detector which detects the synchronous pattern of the pulse train. A pulse distributor distributes the digital signal pulse train under the control of the detected synchronous pattern by forcibly resetting the frame of the distributed digital signal pulses when the frame of the digital signal pulse train is nonsynchronous and providing a reset pulse for resetting itself independently of the forcible resetting at least once per frame of the digital signal pulse train. A gate circuit connected between the detector and the pulse distributor prohibits further forcible resetting of the pulse distributor until the next succeeding frame of the digital signal pulse train.

PULSE DISTRIBUTING CIRCUIT

SYNCHRONISM PROTECTING CIRCUIT

SYNCHRONISM PROTECTING CIRCUIT

FRAME SYNCHRONIZATION SYSTEM FOR SYNCHRONIZING THE FRAME OF A DIGITAL SIGNAL TRANSMISSION

DESCRIPTION OF THE INVENTION

The present invention relates to a frame synchronization system. More particularly, the invention relates to a frame synchronization system for synchronizing the frame of a digital signal pulse train.

In digital signal transmission, and particularly in time division multiplex code modulation transmission, or PCM transmission, frame synchronism is necessary in order to derive the code pulse for each channel from the received pulse train in accordance with the determined order and to convert time division into space division. Nonsynchronism of the frames disrupts normal communication, so that in normal transmission it is desirable to maintain high stability, prevent nonsynchronism of the frames due to transmission line error and provide pull-in of the frames to their synchronous positions as soon as possible, and especially in the event of nonsynchronism of the frames.

When a fundamental group comprises about 24 channels, PCM pulses of the fundamental groups are further time division multiplexed or multiplied, groups of higher orders are constituted in order, and thousands to many tens of thousands of channels are transmitted via a transmission line of great capacity such as, for example, a waveguide, nonsynchronism of frames in groups of higher order disturbs the synchronism of the frames in groups of lower order. This disrupts communication considerably. Under such circumstances, the synchronization of the frames is of increased importance since frame synchronism provides high stability and rapid pull-in.

There are many different types of frame synchronization systems. Problems arise in the known systems due to the need for stabilizing the synchronization and speeding up the pull-in time, as well as in their operation.

The principal object of the present invention is to provide a new and improved frame synchronization system for synchronizing the frames of a digital signal transmission. The frame synchronization system of the present invention overcomes and solves the problems of the known systems. The frame synchronization system of the present invention provides frame synchronization with precision, efficiency, effectiveness and reliability. The frame synchronization system of the present invention provides synchronization stability. The frame synchronization system of the present invention provides rapid pull-in. The frame synchronization system of the present invention provides improved pull-in time if there is a slight increase in the number of time slots constituting the synchronous pattern. The frame synchronization system of the present invention is simple in structure and is economical in manufacture and operation. The frame synchronization system of the present invention is of considerable flexibility in design, since the invention may be utilized and applied regardless of the arrangement of the synchronization pattern, so that the invention may be utilized in a PCM system which utilizes a different frame synchronizing system or in which the duration of the frame varies.

In accordance with the present invention, a frame synchronization system for synchronizing the frame of a digital signal transmission comprises a detector having an input and an output for detecting the synchronous pattern of a digital signal pulse train. A digital signal pulse train is supplied to the input of the detector. A pulse distributor has outputs constituting the outputs of the system and a reset input coupled to the output of the detector for distributing the digital signal pulse train under the control of the detected synchronous pattern by forcibly resetting the frame of the distributed digital signal pulses when the frame of the digital signal pulse train is nonsynchronous and provides a reset pulse for resetting itself independently of the forcible resetting at least once per frame of the digital pulse train. A gate arrangement is connected between the output of the detector and the reset input of the pulse distributor and prohibits further forcible resetting of the pulse distributor until the next succeeding frame of the digital signal pulse train.

In accordance with the present invention, a frame synchronization system for synchronizing the frame of a digital signal transmission comprises a synchronous pattern detecting circuit having an input and an output for detecting the synchronous pattern of a digital signal pulse train. A digital signal pulse train is supplied to the synchronous pattern detecting circuit. A pulse-distributing circuit has a reset input, an input, a reset output and outputs constituting the outputs of the system and provides the digital signal pulse train for transmission. The pulse-distributing circuit includes reset means for providing a reset pulse for resetting itself at least once per frame of the digital signal pulse train. Clock means is connected to the input of the pulse-distributing circuit and provides clock pulses for controlling the pulse-distributing circuit. A first gate has an input connected to the reset output of the pulse-distributing circuit, an input connected to the output of the synchronous pattern-detecting circuit and an output coupled to the reset input of the pulse-distributing circuit for transferring the reset pulse provided by the pulse-distributing circuit from the reset output to the reset input of the pulse-distributing circuit when there is a zero signal in the output of the synchronous pattern-detecting circuit. A synchronism-protecting circuit has an input connected to the output of the first gate and an output. A second gate has an input connected to the output of the synchronous pattern-detecting circuit, an input connected to the output of the synchronism-protecting circuit, an input coupled to the output of the first gate and an output coupled to the reset input of the pulse-distributing circuit. The output of the second gate is coupled to the last-mentioned input of the second gate for prohibiting the conduction of the second gate by an output signal in the output of the second gate. The first gate has an output signal in its output for removing the prohibition of the conduction of the second gate. The second gate conducts an output signal in the output of the synchronous pattern-detecting circuit when the prohibition of the conduction of the second gate is removed and when there is an output signal in the output of the synchronism-protecting circuit. The output signal in the output of the synchronous pattern-detecting circuit is conducted by the second gate to the reset input of the pulse-distributing circuit for forcibly resetting the pulse-distributing circuit.

The output of the second gate is coupled to the last-mentioned input of the second gate via a flip-flop circuit. The output of the first gate is coupled to an input of the second gate via the flip-flop circuit, the output of the flip-flop circuit being coupled to an input of the second gate, the set input of the flip-flop circuit being connected to the output of the second gate and the reset input of the flip-flop circuit being connected to the output of the first gate. The flip-flop circuit is coupled to an input of the second gate via a time delay line.

In accordance with the present invention, a method of synchronizing the frame of a digital signal transmission comprises detecting the synchronous pattern of a digital signal pulse train, distributing the digital signal pulse train under the control of the detected synchronous pattern, forcibly resetting the frame of the distributed digital signal pulses when the frame of the digital signal pulse train is nonsynchronous, resetting the frame of the distributed digital signal pulses under clock control at least once per frame of the digital signal train, and prohibiting further forcible resetting of the frame of the distributed digital signal pulses until the next succeeding frame of the digital signal pulse train.

In the method of synchronizing the frame of a digital signal transmission, the frame of the distributed digital signal pulses may be forcibly reset when the detected synchronous pattern is in a time slot prior to its synchronous position, or the frame of the distributed digital signal pulses may be forcibly reset when the detected synchronous pattern is in a time slot subsequent to its synchronous position.

In order that the present invention may be readily carried into effect it will now be described with reference to the accompanying drawings, wherein:

FIG. 1 is a block diagram of an embodiment of the frame synchronization system of the present invention;

FIGS. 2*a*, 2*b*, 2*c*, 2*d* and 2*e* are graphical presentations of waveforms for explaining the operation of the system of FIG. 1;

FIG. 3 is a circuit diagram of a pulse-distributing circuit which may be utilized as the pulse-distributing circuit of the system of FIG. 1;

FIGS. 4*a* and 4*b* are a graphical presentation of waveforms appearing in the synchronous pattern-detecting circuit and a block diagram of a synchronous pattern-detecting circuit which may be utilized as the synchronous pattern-detecting circuit of the system of FIG. 1;

FIGS. 5*a* and 5*b* are a graphical presentation of waveforms appearing in the synchronous pattern-detecting circuit and a block diagram of a synchronous pattern-detecting circuit which may be utilized as the synchronous pattern-detecting circuit of the system of FIG. 1;

Figure 1:
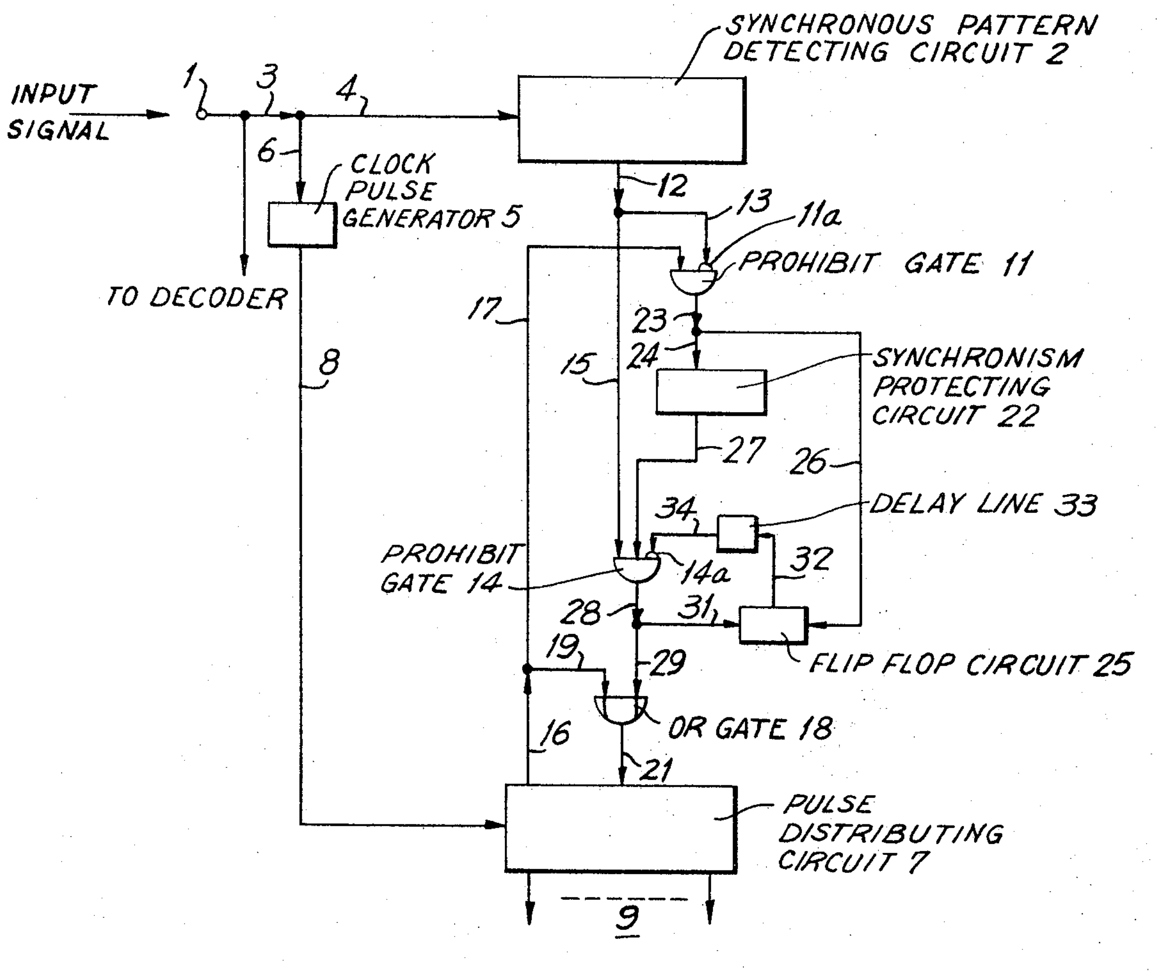

In FIG. 1, a PCM pulse train is supplied via an input terminal 1 to the input of a synchronous pattern-detecting circuit 2. The input terminal 1 is connected to the input of the synchronous pattern-detecting circuit 2 via leads 3 and 4. The input 1 is connected to an input of a block pulse generator 5 via the lead 3 and a lead 6. The output of the clock pulse generator 5 is connected to an input of a pulse-distributing circuit 7 via a lead 8.

The pulse-distributing circuit 7 has a plurality of outputs 9 which constitute the outputs of the frame synchronization system of FIG. 1 and provide the digital signal pulse train for transmission. The output of the synchronous pattern-detecting circuit 2 is connected to the prohibit input 11*a* of a prohibit gate 11 via leads 12 and 13. The output of the synchronous pattern-detecting circuit 2 is also connected to the input of a prohibit gate 14 via the lead 12 and a lead 15. The pulse-distributing circuit 7 has a reset output which is connected to the other input of the prohibit gate 11 via leads 16 and 17.

The reset output of the pulse-distributing circuit 7 is also connected to an input of an OR gate 18 via the lead 16 and a lead 19. The pulse-distributing circuit 7 has a reset input which is connected to the output of the OR gate 18 via a lead 21. The output of the prohibit gate 11 is connected to the input of a synchronism-protecting circuit 22 via leads 23 and 24. The output of the prohibit gate 11 is also connected to the reset input of a flip-flop circuit 25 via the lead 23 and a lead 26.

The output of the synchronism-protecting circuit 22 is connected to another input of the prohibit gate 14 via a lead 27. The output of the prohibit gate 14 is connected to the other input of the OR gate 18 via leads 28 and 29. The output of the prohibit gate 14 is also connected to the set input of the flip-flop 25 via a lead 31. The output of the flip-flop 25 is connected to the prohibit input 14*a* of the prohibit gate 14 via a lead 32, a delay line 33 and a lead 34.

The synchronous pattern-detecting circuit 2 provides an output signal or pulse in the lead 12 when the digital signal pulse train supplied to the input terminal 1 includes frames which are in synchronism; that is, the synchronous pattern of the frame of the digital signal or PCM pulse train supplied to the input terminal 1 is the same as a predetermined synchronous pattern. The prohibit gate 11 transmits an output pulse to the lead 23 only when there is an output signal or pulse in the lead 16 from the reset output of the pulse-distributing circuit 7 and there is no output signal or pulse in the lead 12.

Figure 6:
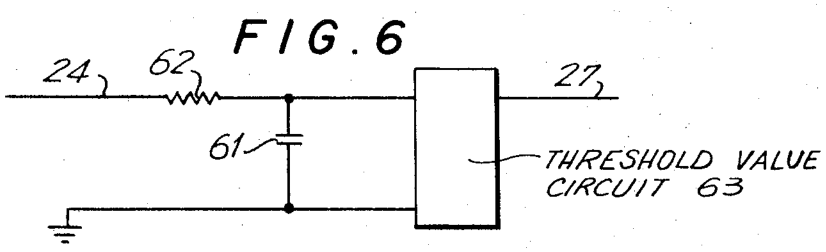
FIG. 6 is a circuit diagram of a synchronism-protecting circuit which may be utilized as the synchronism-protecting circuit of the system of FIG. 1.

The synchronism-protecting circuit 22 may comprise, for example, a capacitance-resistance or CR integrating circuit for storing signals or pulses in the lead 23 transferred by the prohibit gate 11. The synchronism-protecting circuit 22 transmits stored pulses exceeding a predetermined threshold level or value. A suitable synchronism-protecting circuit which may be utilized as the synchronism-protecting circuit 22 of FIG. 1 is shown in FIG. 6.

When the frame of the pulse-distributing circuit is synchronous with the PCM pulse train and when the transmission errors, caused by noise or cross talk in the transmission lines, occur in the synchronous pattern pulses of the PCM pulse train, the synchronous pattern-detecting circuit 2 cannot detect the synchronous pattern pulses. This results in the synchronous condition of the system being unstable for one or a few transmission errors. The synchronism-protecting circuit 22 stabilizes the synchronous condition of the system.

The output of the prohibit gate 11 is the input of the synchronism-protecting circuit 22. If transmission errors occur in the synchronous pattern pulses, there is no pulse in the lead 12 in a time slot of the reset output of the lead 16. The prohibit gate 11 transmits the output pulses to the synchronism-protecting circuit 22, which stores said pulses and protects the system to turn to the reframing action. The synchronism-protecting circuit 22 provides output signals which are transmitted until the system comes back to its synchronous condition, when the outputs of the prohibit gate 11 are provided at a density above a constant density and it seems to be nonsynchronous.

The prohibit gate 14 transmits an output signal or pulse to the lead 28 only when there is a signal or pulse in the lead 12 from the synchronous pattern-detecting circuit 2 and there is a pulse or signal in the lead 27 from the synchronism-protecting circuit 22 and there is no signal or pulse in the lead 34 from the output of the flip-flop 25. The flip-flop 25 functions as a binary memory circuit.

The flip-flop 25 may comprise any suitable bistable multivibrator. The flip-flop 25 provides an output signal or pulse in the lead 32 when a signal or pulse is supplied to its set input via the lead 31. The delay line 33 may comprise any suitable delay line such as, for example, an analog or digital delay line, which delays the PCM pulse for a period of one time slot. The OR gate 18 transmits a signal or pulse to its output in the lead 21 when there is a signal or pulse in either the lead 19 or the lead 29.

The pulse-distributing circuit 7 functions to count the clock pulses supplied to its input via the lead 8 and produces polyphase pulses for separating the pulses transmitted via the outputs 9. The counting in the pulse-distributing circuit 7 is accomplished by a counter.

The pulse-distributing circuit 7 produces a reset pulse which is provided as an output pulse or signal in its reset output and is therefore supplied to an input of the OR gate 18 via the leads 16 and 19, when said pulse-distributing circuit is advanced by one frame. The position of the reset pulse is set so that when the system is in normal synchronism said reset pulse coincides in time with the output of the synchronous pattern-detecting circuit 2 which appears in the lead 12. The pulse-distributing circuit 7 is also reset at the start position by a signal or pulse in the output of the OR gate 18 which appears in the lead 21 and is therefore supplied to the reset input of said pulse-distributing circuit. When the pulse-distributing circuit 7 is reset, it commences to advance under the control of the clock pulses from the clock pulse generator 5, which clock pulses are supplied to its input via the lead 8. The clock pulse generator 5 derives the fundamental repetition frequency from the PCM pulse train and provides successive clock pulses at its output in the lead 8.

Figures 2A, 2B, 2C, 2D, 2E:
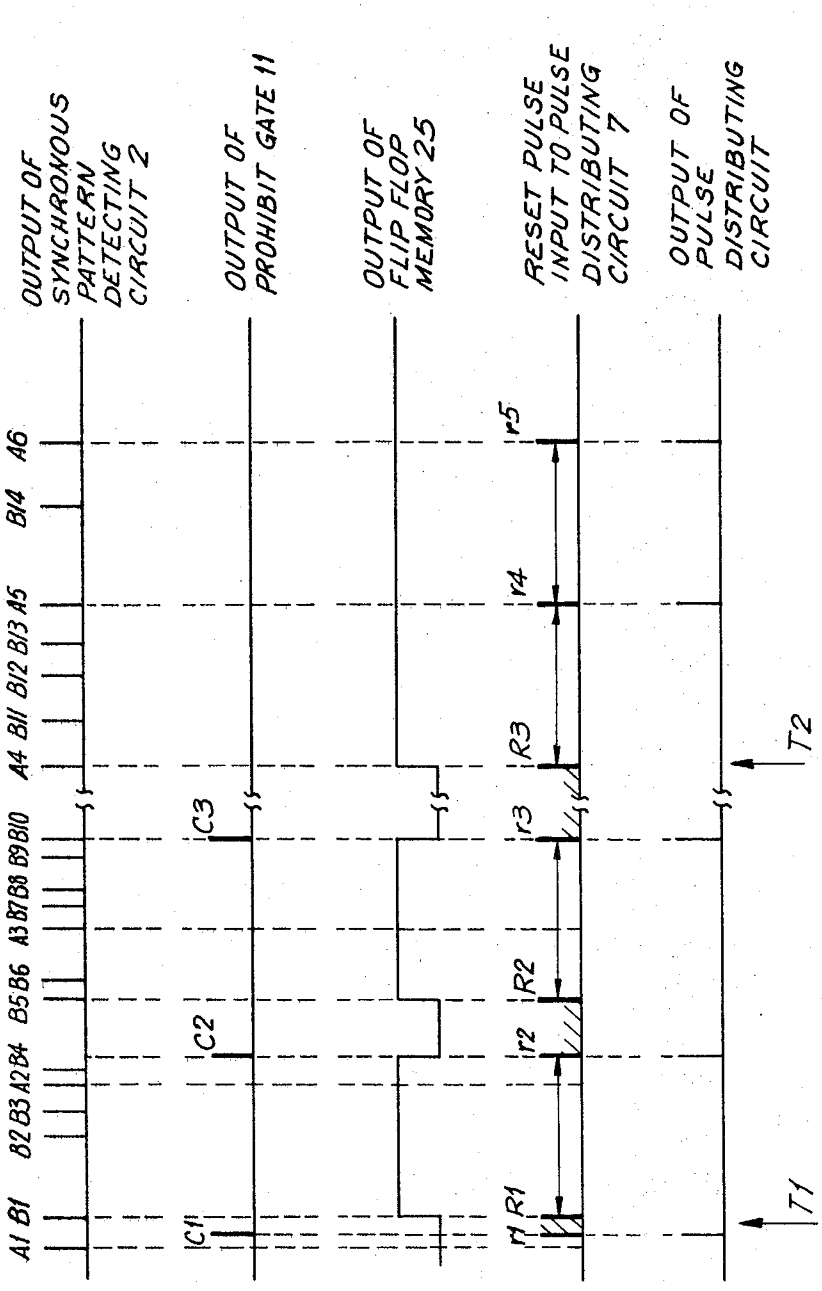

FIGS. 2*a*, 2*b*, 2*c*, and 2*e* show the signals or pulses appearing at various points in the frame synchronization system of FIG. 1. FIG. 2*a* discloses the output signals or pulses of the synchronous pattern detecting circuit 2. The pulses A1, A2, A3, A4, A5 and A6 are generated when the synchronous pattern for the frame of the PCM signals is received by the synchronous pattern-detecting circuit 2 and indicates that said frames are in synchronism. The pulses B1 and B14 are generated when the frames of the incoming PCM signals are out of synchronism or are nonsynchronous. That is, the pulses B1 to B14 of FIG. 2*a* are generated when the synchronous pattern for the frames of the PCM signals comprise pulses in positions other than the positions in which they would be if the frames were in synchronism. The pulses B1 to B14 are information pulses, whereas the pulses A1 to A6 are frame pulses.

FIG. 2*b* discloses the output signals or pulses of the prohibit gate 11 of the system of FIG. 1. The prohibit gate 11 transmits the pulses C1, C2 and C3 when the reset pulses or signals provided at the reset output of the pulse-distributing circuit 7, which appear at the lead 16, and which are shown in FIG. 2*e*, are provided at a time when there is no output pulse or signal provided by the synchronous pattern-detecting circuit 2.

FIG. 2*c* discloses the output pulses produced by the flip-flop circuit 25. FIG. 2*d* discloses the reset pulses or signals supplied to the reset input of the pulse-distributing circuit 7 via the lead 21. In FIG. 2*d*, the reset pulses *r*1, *r*2, *r*3, *r*4 and *r*5 are self-reset pulses which function to reset the pulse-distributing circuit 7 after being provided in the lead 16 from the reset output of said pulse-distributing circuit. In FIG. 2*d*, the pulses R1, R2 and R3 are forced reset pulses which forcibly reset the pulse-distributing circuit 7, or more particularly, the frames of the distributed pulses provided by said pulse-distributing circuit, when the said pulse-distributing circuit does not provide a reset pulse at its reset output in the lead 16.

In the normal synchronous condition, when the pulse-distributing circuit 7 provides a reset pulse at its reset output in the lead 16, the synchronous pattern-detecting circuit 2 detects the synchronous pattern-detecting circuit 2 detects the synchronous pattern of the PCM signal supplied to its input via the lead 4 and provides in the lead 12 an output pulse or signal. The output pulse from the synchronous pattern-detecting circuit 2, which indicates that the detected synchronous pattern shows that the frames are in synchronism, is supplied to the prohibit input 11*a* of the prohibit gate 11 and thereby prohibits said prohibit gate from transmitting a signal. Since the prohibit gate 11 does not transmit a signal or pulse, there is no signal supplied to the input of the synchronism-protecting circuit 22 and there is no signal provided by said synchronism-protecting circuit, so that there is no signal supplied to the prohibit gate 14 via the lead 27. Thus, even if the synchronous pattern-detecting circuit 2 detects a synchronous pattern which indicates that the frames of the PCM signal are in synchronism, that is, that the pulses of the synchronous pattern are in the positions of the information pulses B1 to B14 of FIG. 2*a*, and therefore produces an output signal in the lead 12, there will be no output signal or pulse in the lead 29, since the prohibit gate 11 will be prohibited and therefore nonconductive, the synchronism-protecting circuit 22 will be nonoperative and the prohibit gate 14 will be nonconductive. In such circumstances, the pulse-distributing circuit 7 is not reset. The reset pulse provided at the reset output of the pulse-distributing circuit 7, and in the lead 16, is transmitted via said lead, the lead 19, the OR gate 18 and the lead 21 to the reset input of said pulse-distributing circuit. The pulse-distributing circuit 7 is thereby self-reset and normal operation is maintained.

The pulse-distributing circuit 7 may comprise a counter circuit which advances automatically from one cycle to the next without reset. Such a counter circuit may comprise, for example, a self-starting ring counter. If such a counter is utilized, the connection between the reset output and the reset input of the pulse-distributing circuit 7, which involves the leads 16, 19 and 21 and the OR gate 18, may be eliminated.

When the frames of the PCM signal supplied to the input terminal 1 of the system of FIG. 1 are nonsynchronous, or out of synchronism, the reset pulses or signals provided by the pulse-distributing circuit 7 at the reset output and the output pulse provided in the lead 12 by the synchronous pattern-detecting circuit 2 do not occur at the same time, since said synchronous pattern-detecting circuit does not produce an output pulse when there is nonsynchronism of the frames. The prohibit gate 11 is thus conductive, since the reset pulse produced by the pulse-distributing circuit 7 is supplied to the input of said prohibit gate via the leads 16 and 17. At such time, the pulse transmitted by the prohibit gate 11 is supplied to the input of the synchronism-protecting circuit 22, which stores the input pulses and, then, if their density is above a constant density, indicative of a nonsynchronous condition, and then produces an output signal or pulse which appears in the lead 27 and is supplied to the corresponding input of the prohibit gate 14. The output pulse of the prohibit gate 11 is also supplied to the reset input of the flip-flop 25 via the lead 26. FIG. 2*b* illustrates the condition of the output pulses of the prohibit gate 11 when the output pulse C1 of the prohibit gate 11 is provided in the lead 27.

The flip-flop 25 is switched to its reset condition by the output pulse from the prohibit gate 11 so that there is no output pulse or signal in the lead 32. Therefore, at the time T1 (FIG. 2*b*) the prohibit gate 14 is in its conductive condition and transmits the pulse in the lead 27, so that said pulse is provided in the lead 29 when the synchronous pattern-detecting circuit 2 provides an output pulse B1 (FIG. 2*a*) in the lead 12. The forced reset pulse R1 (FIG. 2*d*) is then provided in the lead 21 via the OR gate 18 and forcibly resets the pulse-distributing circuit by resetting the frames of the pulses distributed by said pulse-distributing circuit.

When the prohibit gate 14 provides a pulse at its output in the lead 28, it switches the flip-flop 25 to its set condition via the lead 31. The flip-flop 25 then produces an output signal or pulse in the lead 32. The output pulse of the flip-flop 25 is delayed for a period of one time slot in the delay lines 33 and is then supplied to the pattern-detecting input 14*a* of the prohibit gate 14 thereby prohibiting said prohibit gate and switching said prohibit gate to its nonconductive condition. The flip-flop 25 is not again switched in condition until the output pulse C2 (FIG. 2*b*) from the prohibit gate 11 is supplied to the reset input of said flip-flop via the lead 26 at the same time that the self-reset pulse *r*2 (FIG. 2*d*) is produced by the pulse-distributing circuit 7, one frame later. The output pulses B2, B3, A2 and B4 provided at the output of the synchronous pattern-detecting circuit 2 (FIG. 2*a*) are then prohibited or blocked by the prohibit gate 14, so that the pulse-distributing circuit 7 is not reset.

The flip-flop 25 is switched to its reset condition by the output pulse C2 (FIG. 2*b*) of the prohibit gate 11, thereby switching the prohibit gate 14 to its conductive condition. The forced reset pulse R2 (FIG. 2*d*) produced by the synchronous pattern-detecting circuit 2 is then supplied via the next output pulse B5 (FIG. 2*a*) of said synchronous pattern-detecting circuit to the reset input of the pulse-distributing circuit 7 via the leads 12, 15, 28, 29 and 21, the prohibit gate 14 and the OR gate 18. The pulse-distributing circuit 7 is thus forcibly reset.

The operation is then repeated. At each stage of the operation, the position of the reset pulse at the reset output of the pulse-distributing circuit 7 is approached gradually until at last the correct pulse pattern for frame synchronism is detected and the forced reset pulse R3 (FIG. 2*d*) is supplied by the output frame pulse A4 of the synchronous pattern-detecting circuit 2 (FIG. 2*a*). The pulse-distributing circuit 7 is then reset at the correct synchronous position. Then, since the output of the prohibit gate 11 is not transmitted, the flip-flop 25 is not switched to its reset condition, so that the prohibit gate 14 remains prohibited, or in its nonconductive condition, and does not permit the forcible resetting of the pulse-distributing circuit 7 by the pulses B11, B12, B13, A5, B14 and A6 (FIG. 2*a* ) The pulse-distributing circuit 7 is reset at the correct synchronous position of the frames by succeeding pulses, and the pulliin is completed.

The pull-in process of the frame synchronization system of the present invention is governed by the probability that a pulse train of the same pattern as the synchronous pattern is produced at the location of the information pulse and there is thus a forced resetting of the pulse-distributing circuit 7. When the synchronous pulse pattern comprises a plurality of $n$ time slots, the probability that the pulse train will have the same pattern as the synchronous pulse pattern is the same probability as that the $n$ time slots of the information pulses will coincide completely with the pulses of the synchronous pulse pattern. Therefore, the probability is reduced considerably by an increase in the number of time slots $n$. More particularly, at such time, the probability that the synchronous position will be maintained by a forced reset in the pull-in process, in the period of time of one frame, is reduced, so that the pull-in time is rapidly reduced.

The frame synchronization system of the present invention, as described, thus has the advantage that the pull-in time may be considerably improved by a slight increase in the number of time slots which constitute the pulse pattern for frame synchronism or the synchronous pulse pattern. Furthermore, if the spacing of pulses in or internal dispersion of the synchronism-protecting circuit 22 is suitably set, a response to the output pulse of the prohibit gate 11, which may be provided on occasion due to transmission line error, or the like, during normal synchronism of the frames, may be suppressed so that very high stability of synchronism is obtained.

Figure 3:
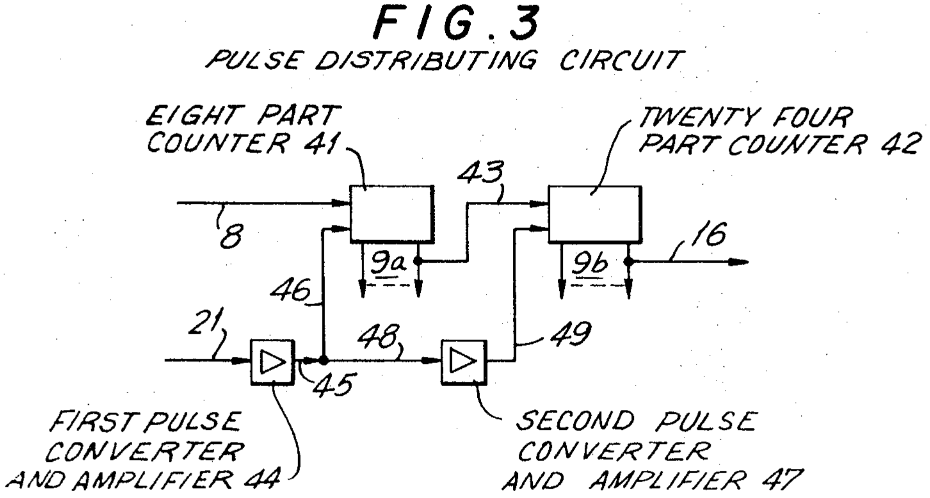

FIG. 3 is an embodiment of a pulse-distributing circuit which may be utilized as the pulse-distributing circuit 7 of the frame synchronization system of FIG. 1. In FIG. 3, an eight-part counter 41 operates at a speed which permits it to respond to the clock pulses supplied via the lead 8. The eight-part counter 41 provides eight-phase output pulses in part of the outputs 9 (FIG. 1) designated as 9*a*. The outputs 9*a* of the eight-part counter 41 are connected to an input of a 24-part counter 42 via a lead 43. The 24-part counter 42 operates at a lower speed of response; that is, at a speed which is one-eighth the speed of response of the eight-part counter 41. The 24-part counter 42 is operated by the output pulses of the eight-part counter 41 and provides in its outputs 9*b*, which are part of the outputs 9 (FIG. 1), 24-phase output pulses. The output pulses in the outputs 9*b* of the 24-part counter 42 are provided in the lead 16 which is the reset output of the pulse-distributing circuit.

In FIG. 3, the input is provided via the lead 8 which supplies the input pulses. The lead 21 is connected to the reset input. The lead 21 is connected to the input of a first pulse converter and amplifier 44. The output of the first pulse converter and amplifier 44 is connected to an input of the eight-part counter 41 via leads 45 and 46. The output of the first pulse converter and amplifier 44 is also connected to the input of a second pulse converter and amplifier 47 via the lead 45 and a lead 48. The output of the second pulse converter and amplifier 47 is supplied to an input of the 24-part counter 42 via a lead 49.

The first pulse converter and amplifier 44 converts the reset pulse in the lead 21 to a waveform suitable for the reset counter 41 and amplifies such pulse. The second pulse converter and amplifier 47 converts the reset pulse in the lead 45 to a waveform suitable for the reset counter 42 and amplifies and said reset pulse. A pulse in the lead 46, from the first pulse converter and amplifier 44, resets the eight-part reset counter 41 and a pulse in the lead 49, from the second pulse converter and amplifier 47, resets the 24-part reset counter 42. In accordance with the present invention, the eight-part and 24-part counters 41 and 42, respectively, are reset by forced reset pulses. The counters 41 and 42 are advanced by clock pulses in the lead 8 which succeed the forced reset pulses. Thus, at least the counter 41, or more particularly, the memory circuit of the first stage of said counter, must be capable of being reset within one time slot and must respond to the next succeeding clock pulse.

The reset pulse supplied to the eight-part counter 41 via the lead 46 must be of sufficiently short duration or narrow width and said counter must have a response speed which is great enough to enable it to respond to such narrow width. The 24-part counter 42 may be reset at a slower rate, since the input pulse in the lead 43 is supplied to said counter eight time slots after commencement of the advance of the eight-part counter 41. The duration of the reset pulse which is supplied to the 24-part counter 42 via the lead 49 must thus be of sufficient duration or width to facilitate reset, and the speed of response of said 24-part counter may be relatively low.

The self-resetting of the pulse-distributing circuit 7 does not give rise to any problems, since the time of self-reset is determined by the counters of the pulse-distributing circuit itself and the delay may be compensated for by providing the self-reset pulse of the reset input of said pulse-distributing circuit a little earlier, for example, by estimating the delay of the self-reset.

Figure 4A:
Figure 4B:
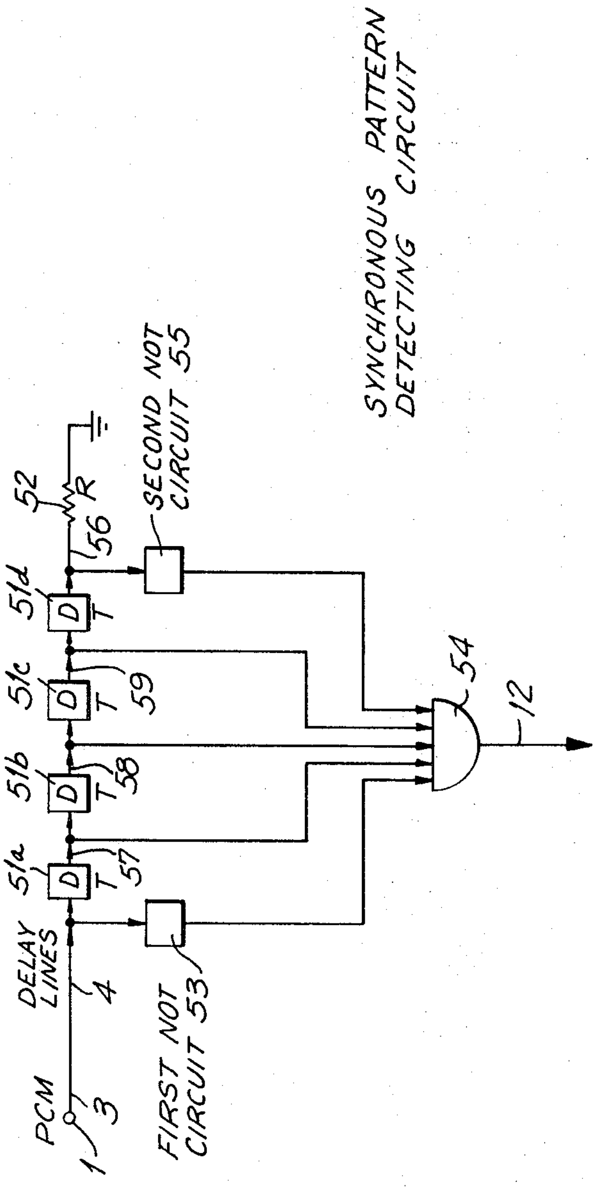
Figure 5A:
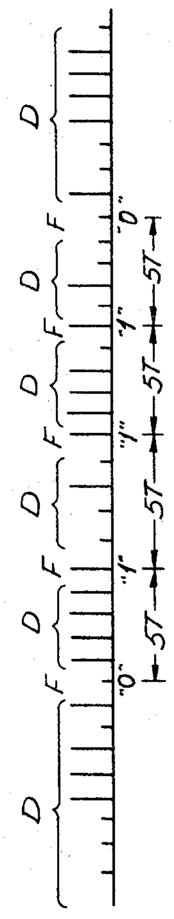
Figure 5B:
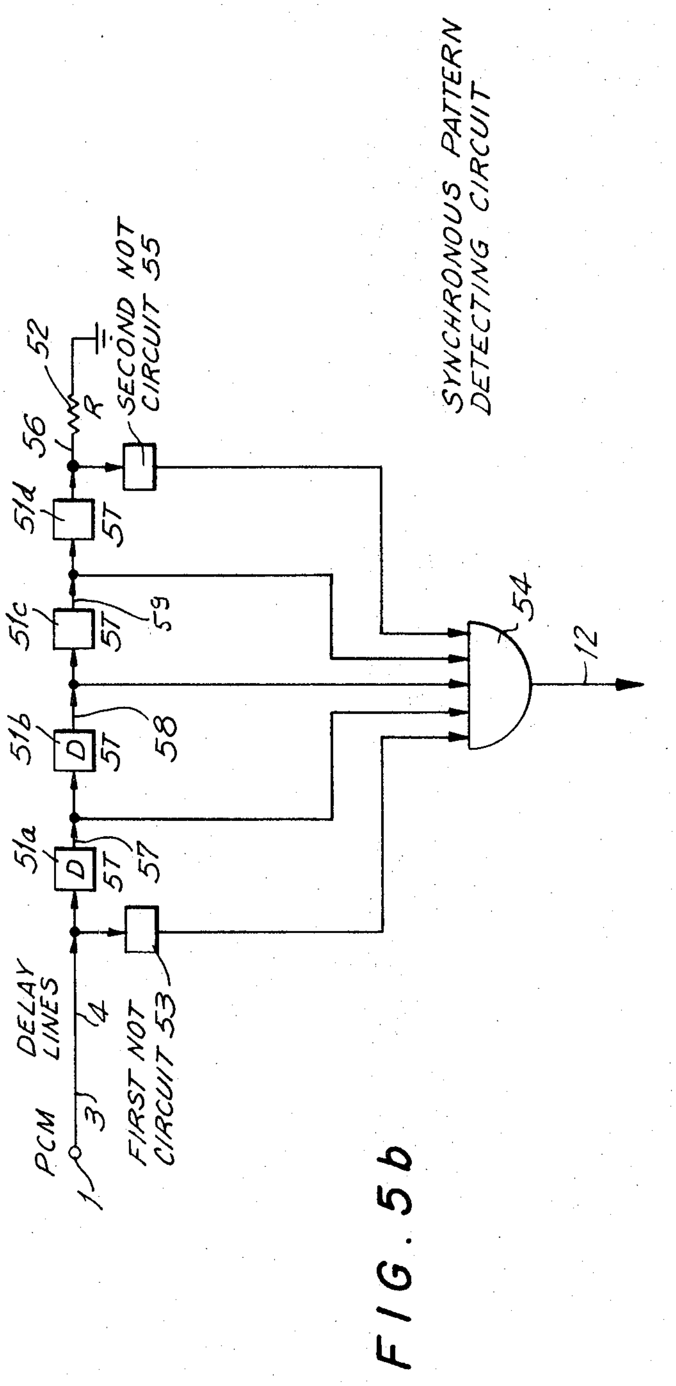

FIGS. 4*a* and 4*b* show a synchronous pattern-detecting circuit which may be utilized as the synchronous pattern-detecting circuit 2 of the frame synchronization system of FIG. 1. FIGS. 5*a* and 5*b* show a synchronous pattern-detecting circuit which may be utilized as the synchronous pattern-detecting circuit 2 of the frame synchronization system of FIG. 1. FIGS. 4*b* and 5*b* disclose identical circuits, whereas FIG. 4*a* discloses one method of operation and FIG. 5*a* discloses another method of operation. FIG. 4*a* discloses the method of operation of the circuit of FIG. 4*b*, and FIG. 5*a* discloses the method of operation of the circuit of FIG. 5*b*.

In each of the FIGS. 4*b* and 5*b*, the synchronous pattern-detecting circuit comprises a delay line which provides a plurality of component delay times each of a single time slot of the PCM pulse supplied via the input terminal 1 and the leads 3 and 4. Thus, in FIG. 4*b*, a plurality of delay line components 51*a*, 51*b*, 51*c* and 51*d* are connected in series in the lead 4 from the input terminal 1. A resistor 52, having a resistance R, is connected in series with the last delay line 51*d* and is connected to a point at ground potential. A first NOT circuit 53 has an input which is connected to the lead 4 at the input to the first delay line 51*a*. The output of the first NOT circuit 53 is connected to an input of an AND gate 54. The output of the AND gate 54 is connected to the lead 12 (FIG. 1).

The input of a second NOT circuit 55 is connected to a lead 56 at the output of the fourth delay line 51*d*. The output of the second NOT circuit 55 is connected to a second input of the AND gate 54. A point in a lead 57, which point is common to the output of the first delay line 51*a* and the input of the second delay line 51*b*, is connected to a third input of the AND gate 54. A point in a lead 58, which is common to the output of the second delay line 51*b* and the input to the third delay line 51*c*, is connected to a fourth input of the AND gate 54. A point in a lead 59, which point is common to the output of the third delay line 51*c* and the input of the fourth delay line 51*d*, is connected to a fifth input of the AND gate 54.

Since the circuits of FIGS. 4*b* and 5*b* are the same, their components are identified by the same reference numerals. FIG. 4*a* discloses the pulse pattern or pattern of pulses for frame synchronism of the synchronous pattern-detecting circuit of FIG. 4*b*. FIG. 5*a* discloses the pulse pattern or pattern of pulses for the synchronous pattern-detecting circuit of FIG. 5*b*. In each of FIGS. 4*a* and 5*a*, each of the pulses F is in the time slot of the pattern pulse for frame synchronism and each of the pulses D is in the time slot of an information pulse.

In FIG. 4*b*, the PCM pulse train in the lead 4 is delayed by one time slot in each of the delay lines or delay line components 51*a*, 51*b*, 51*c* and 51*d*, since each of said delay lines provides a delay of one time slot T. The delay lines 51*a* to 51*d* are matched and terminated by the resistor 52. The first and second NOT circuits 53 and 55 are utilized to adapt the synchronous pattern-detecting circuit to a pattern for synchronism, as shown in FIG. 4*a*, which pattern is the binary indication 01110. When a signal or pulse appears in each of the five inputs to the AND gate 54, the synchronous pattern-detecting circuit provides an output signal or pulse in the lead 12 (FIG. 1). As indicated by FIGS. 4*a* and 4*b*, when the PCM pulse train has the same pattern as the synchronous pattern 01110, the signal is provided in each of the five inputs of the AND gate 54 and an output pulse or signal is provided in the lead 12.

In FIG. 5*b*, each delay line or delay line component 51*a* to 51*d* provides a delay time of five time slots, or a delay time of 5T. Thus, in FIG. 4*b* the pattern pulses F have frame synchronism or the synchronous pulse pattern is arranged in succession, whereas in FIG. 5*b*, the synchronous pulse pattern or pattern pulses for frame synchronism are arranged at intervals of five time slots in the information pulse D. The synchronous pulse pattern in FIGS. 5*a* and 5*b* is 01110, as in FIGS. 4*a* and 4*b*. Thus, when the PCM pulse train in the lead 4 has the same pulse pattern as the synchronous pulse pattern, a signal or pulse is provided in each of the five inputs and the AND gate 54. The AND gate 54 is thus switched to its conductive condition and provides a pulse or signal in the lead 12.

The frame synchronization system of the present invention may be utilized with any suitable synchronous pulse pattern or pattern pulses for frame synchronism. Such suitable synchronous pulse patterns include those in which the pattern pulses or pulses of the synchronous pulse pattern follow each other in succession, as described with regard to FIGS. 4*a* and 4*b*, or are spaced from each other at a determined interval, as illustrated by the example of FIGS. 5*a* and 5*b*. Furthermore, a combination of the successive and spaced pulse arrangements permits considerable flexibility in the design of the PCM system.

In each of FIGS. 4*b* and 5*b*, the delay lines 51*a* to 51*d* may be replaced by a shift register which comprises a plurality of memory elements, for example. Furthermore, such shift register, or the indicated delay lines, may be utilized to convert the PCM pulse train from its series condition to a parallel condition, relative to time, and may therefore be utilized as the series-parallel converter ordinarily utilized in a PCM demodulator. For the foregoing reason, the frame synchronization system of the present invention is inexpensive in manufacture and operation.

Figure 7:
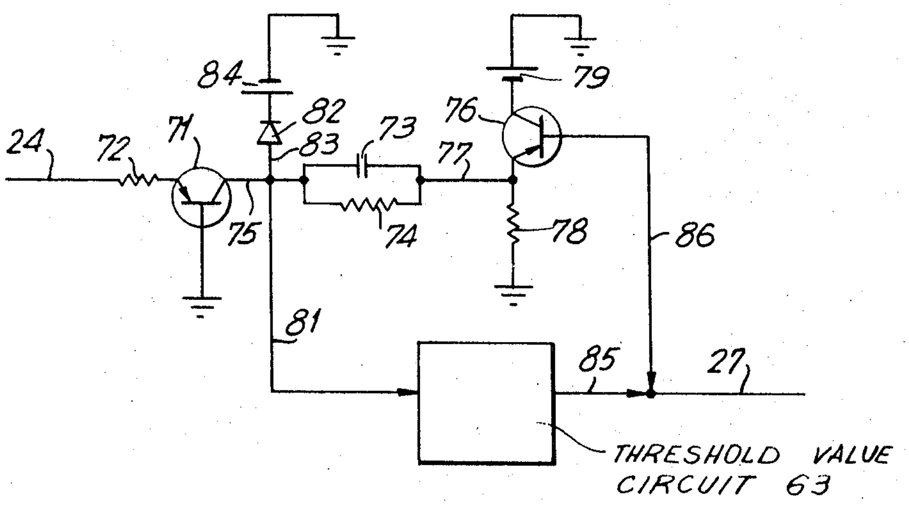
FIG. 7 is a circuit diagram of a synchronism-protecting circuit which may be utilized as the synchronism-protecting circuit of the system of FIG. 1.

FIG. 6 discloses an embodiment of a synchronism-protecting circuit which may be utilized as the synchronism-protecting circuit 22 of the system of FIG. 1. FIG. 7 discloses another embodiment of a synchronsim-protecting circuit which may be utilized as the synchronism-protecting circuit 22 of the system of FIG. 1. In FIG. 6, a capacitance-resistance or CR circuit 61, 62 is connected to the lead 24 (FIG. 1) which constitutes the input to the synchronism-protecting circuit 22. The CR circuit 61, 62 is an integrating circuit. The input of a threshold value circuit 63 is connected to the output of the CR integrating circuit 61, 62. The output of the threshold value circuit 63 is connected to the lead 27 (FIG. 1).

In each of FIGS. 6 and 7, the threshold value circuit 63 may comprise any suitable threshold value circuit such as, for example, a Schmitt trigger. In FIG. 6, an output signal or pulse is provided in the lead 27 (FIG. 1) when input pulses or signals are supplied continuously to the CR integrating circuit 61, 62 and the output voltage of said integrating circuit exceeds the threshold level of value of the threshold value circuit 63.

The embodiment of FIG. 7 is preferred to that of FIG. 6, since the embodiment of FIG. 7 provides an extremely stable and arbitrary synchronism-protecting characteristic. In FIG. 7, the input lead 24 (FIG. 1) is connected to the emitter electrode of a first transistor 71 via a resistor 72. The base electrode of the first transistor 71 is connected to a point at ground potential. The collector electrode of the first transitor 71 is connected to the input of a CR integrating circuit 73, 74 via a lead 75. The output of the CR integrating circuit 73, 74 is connected to the emitter electrode of a second transistor 76 via a lead 77. The emitter electrode of the second transistor 76 is connected to a point at ground potential via a resistor 78. The second transistor 76 is biased by a suitable DC source such as, for example, a battery 79, which is connected between the collector electrode of said transistor and a point at ground potential.

In FIG. 7, the collector electrode of the first transistor 71 is connected to the input of the threshold value circuit 63 via the lead 75 and a lead 81, and is also connected to the anode of a clamping diode 82 via the lead 83. The cathode of the clamping diode 82 is connected to a suitable DC source such as, for example, a battery 84. The battery 84 is connected to a point at ground potential. The output of the threshold value circuit 63 is connected to the lead 27 (FIG. 1) via a lead 85, and the base electrode of the second transistor 76 is connected to the lead 27 via a lead 86.

The embodiment of FIG. 7 is superior to the embodiment of FIG. 6, because in FIG. 6, the period of time required for releasing the threshold value circuit 63 and the integration voltage varies in accordance with the concentration of pulses after the operation of said threshold value circuit. The embodiment of FIG. 7, however, overcomes this shortcoming, since in Fig. 7, as the integration voltage of the CR integrating circuit 73, 74 increases and as the threshold value circuit 63 operates, the reference voltage of said integrating circuit is increased, because the output of said threshold value circuit is connected with said integrating circuit via the second transistor 76 and the integration voltage is clamped by the clamping diode 82.

In modern PCM transmission systems, several PCM pulse trains which are independent from each other, and which have clock frequencies which are slightly different from each other, are synchronized at a common clock frequency which is slightly higher than that of any of the component PCM pulse trains, without a loss of information, and are then time-division multiplied or multiplexed and are transmitted through the common transmission line as a large group.

In one PCM transmission system, a shortage in the information pulse based on the difference between the common clock frequency and the clock frequency of the PCM pulse trains is compensated for by shifting or delaying the frame position of the synchronized PCM trains by more than one time slot and inserting the space code. The shift of the frame position is occasionally detected at the receiver and the inserted space code is detected or discriminated and eliminated. In another PCM transmission system, the space code is always inserted for more than one time slot and such insertion is spaced occasionally by shifting or advancing the frame position. The frame synchronization system of the present invention may be utilized in a PCM transmission system in which the duration of the frame is occasionally varied in the aforedescribed manner.

Figure 8:
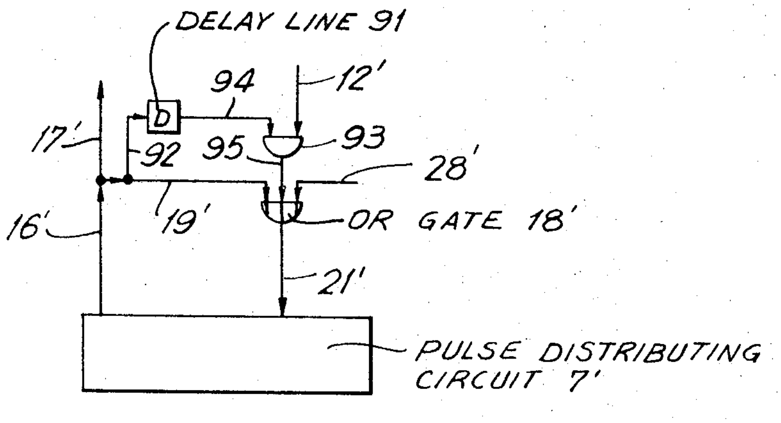
FIG. 8 is a block diagram of a modification of the frame synchronization system of the present invention.
Figure 9:
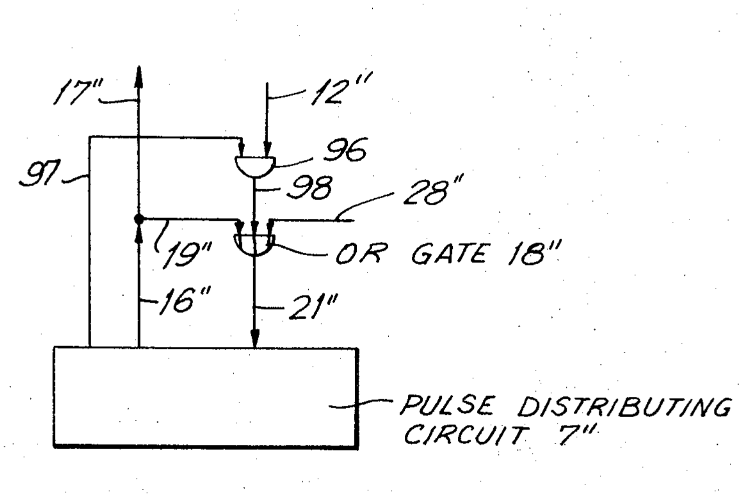
FIG. 9 is a block diagram of another modification of the frame synchronization system of the present invention.

FIGS. 8 and 9 disclose modifications of the frame synchronizing system of the present invention. In FIG. 8, the pulse distributing circuit 7 , the OR gate 18′, and the leads 12′, 16′, 17′, 19′, 21′ and 28′ are the same as the corresponding pulse-distributing circuit, OR gate and leads of the system of FIG. 1.

In FIG. 8, the reset signal provided at the reset output of the pulse-distributing circuit 7′ is supplied to an input of the OR gate 18′ via the leads 16′ and 19′. The reset output signal of the pulse-distributing circuit 7′ is also supplied to the input of the delay line 91 via the lead 16′ and a lead 92. The output of the delay line 91 is connected to an input of an AND gate 93 via a lead 94. The lead 12′ is connected to the other input of the AND gate 93. The output of the AND gate 93 is connected to a third input of the OR gate 18′ via a lead 95. The output of the OR gate 18′ is connected to the reset input of the pulse-distributing circuit 7′.

The delay line 91 of FIG. 8 provides a time delay of a determined number of time slots. If the synchronous pattern of the frames or the synchronous frame position is delayed by a determined number of time slots when the system is in its normal synchronous condition, pulses or signals are provided in each of the input leads 94 and 12′ of the AND gate 93. The AND gate 93 is thus switched to its conductive condition and provides a pulse or signal at its output which is transmitted via the lead 95. The signal or pulse in the lead 95 is transmitted by the OR gate 18' and is supplied to the reset input of the pulse-distributing circuit 7' via the lead 21', so that said pulse-distributing circuit is forcibly reset at a time which is the predetermined number of time slots after the provision of the reset pulse at the reset output of said pulse-distributing circuit. Thus, nonsynchronism does not occur at such time and there is a rapid pull-in of the frame into the correct synchronous position.

In FIG. 9, the reset output of the pulse-distributing circuit 7'' is connected to an input of the OR gate 18'' via the leads 16'' and 19''. The pulse distributing circuit 7'' is provided with a second reset output which is connected to an input of an AND gate 96 via a lead 97. The lead 12'' is connected to the other input of the AND gate 96. The output of the AND gate 96 is connected to a third input of the OR gate 18'' via a lead 98.

The pulse-distributing circuit 7'' provides a first reset pulse or signal at its first reset output in the lead 16'' and also provides a second reset pulse or signal at its second reset output in the lead 97 at a time which is a predetermined number of time slots prior to the provision of the first reset pulse. In other words, the second reset pulse is provided first and the first reset pulse is then provided a predetermined number of time slots after the provision of the first reset pulse. If the synchronous position of a frame is advanced by the predetermined number of time slots when the system is in its normal synchronous condition, there is a signal or pulse in each of the leads 97 and 12'' which are connected to the inputs of the AND gate 96. The AND gate 96 is thus switched to its conductive condition and transmits a signal or pulse in its output lead 98.

The signal in the lead 98 is transmitted by the OR gate 18'' to the reset input of the pulse-distributing circuit 7'' via the lead 21''. The pulse-distributing circuit 7'' is thereby forcibly reset at a time which is the predetermined number of time slots prior to the provision of a reset pulse at the reset output of said pulse-distributing circuit. Thus, nonsynchronism does not occur at such time and there is a rapid pull-in of the frame into the correct synchronous position.

In each of the modifications of FIGS. 8 and 9, the predetermined number of time slots is a predetermined integer. The number of time slots may be extended to a plurality of components, however. Thus, in FIG. 8, the lead 16' may be connected to the inputs of a plurality of delay lines, rather than to the single delay line 91. Each of the plurality of delay lines to which the lead 16' may be connected may provide a delay which is different from those of the others, and the output of each of said plurality of said delay lines would be connected to a corresponding one of the inputs of the AND gate 93. The time delays may, of course, be provided by a delay line having a plurality of taps, each of the taps providing a different delay time and being connected to a corresponding one of the inputs of the AND gate 93.

The modifications of FIG. 9 may be modified by providing the pulse-distributing circuit 7'' with first, second, third, fourth, fifth and so on, reset outputs for providing third, fourth, fifth, and so on, reset pulses, respectively. The pulse-distributing circuit 7'' may thus produce at its first, second, third, fourth, fifth and so on, reset outputs, first, second, third, fourth, fifth, and so on, reset pulses or signals, respectively. The first, second, third, fourth, fifth and so on reset pulses are provided by the pulse-distributing circuit 7'' in determined relationship to each other, relative to time. The various reset output pulses provided by the pulse-distributing circuit 7'' would then be supplied to corresponding inputs of the AND gate 96 via corresponding leads extending from each of the reset outputs to each corresponding input of said AND gate.

The aforedescribed modifications may be utilized for arbitrarily varying the shift of the synchronous position of the frame, as desired, and permitting enhanced flexibility of the design of a PCM transmission system utilizing the system of the present invention. Furthermore, the aforedescribed modification (FIGS. 8 and 9) permits the shifting of the synchronous position of the frame regardless of whether the shift is an advance or a recession. The modifications may also be utilized in a PCM transmission system in which the duration of the frame is constant. In such case, when the system is in a nonsynchronous condition, due to a shift of a suitable number of time slots around the correct synchronous position of the frame, with such correct position at the center, the frame may be pulled in immediately, without the aforedescribed pull-in process.

In the frame synchronization system of the present invention, the synchronous pattern for the frames, or pattern pulses for synchronism, may be arbitrarily selected. The pull-in time, however, may be improved by preventing the synchronous pattern-detecting circuit 2 (FIG. 1) from providing an output pulse or signal at its output for the greater part of the period covering the synchronous pattern, or pattern pulses for frame synchronism, and the information pulses. This is accomplished by utilizing synchronous patterns in which different code indications are provided at the beginning and end of a series of code pulses of a type such as 0111...110 or 1000...001.

Synchronous patterns may also be utilized for this purpose in which a different code indication is added to only the beginning or the end of a series of code pulses of a type such as 0111...111 or 1000...000. Furthermore, the application of the frame synchronization system of the present invention to a PCM system in which the frame occasionally varies in duration, permits the detection of the variation in duration of the frame almost without error.

Although the frame synchronization system of the present invention has been described with reference to its application to PCM transmission systems, said frame synchronization system may, of course, be applied or utilized with other types of digital signal transmission systems.

While the invention has been described by means of specific examples and in a specific embodiment, I do not wish to be limited thereto, for obvious modifications will occur to those skilled in the art without departing from the spirit and scope of the invention.

I claim:

1. A frame synchronization system for synchronization the frame of a digital signal transmission, comprising
   - detecting means having an input and an output for detecting the synchronous pattern of a digital signal pulse train;
   - input means connected to the input of said detecting means for supplying a digital signal pulse train to said detecting circuit;
   - pulse-distributing means having a reset input, an input, a reset output and outputs constituting the outputs of said system and a reset input coupled to the output of said detecting means for distributing the digital signal pulse train under the control of the detected synchronous pattern by forcibly resetting the frame of the distributed digital signal pulses and for providing a reset pulse for resetting itself independently of the forcible resetting at least once per frame of said digital signal pulse train; and
   - first gate means having an input connected to the reset output of the pulse-distributing means, an input connected to the output of the synchronous pattern-detecting circuit and an output coupled to the reset input of the pulse-distributing means for transferring the reset pulse provided by the pulse-distributing means from the reset output to the reset input of the pulse-distributing means when there is a zero signal in the output of the synchronous pattern-detecting circuit;
   - a synchronism-protecting circuit having an input connected to the output of the first gate means and an output for providing output signals for enabling second gate means when input signals are provided at a density above a constant density; and
   - second gate means having a first input connected to the output of the synchronous pattern-detecting circuit, a second input connected to the output of the synchronism-protecting circuit, an output coupled to the reset input of the pulse-distributing means, and a third input coupled to the output of said second gate means and to the output of said first gate means for prohibiting said second gate means from transmitting more than one reset pulse per frame.

2. A frame synchronization system as claimed in claim 1, further comprising flip-flop circuit means having an output, a set input and a reset input, and wherein the output of said second gate means is coupled to the said third input of said second gate means via said flip-flop circuit means and the output of said first gate means is coupled to said third input of said second gate means via said flip-flop circuit means, the output of said flip-flop circuit means being coupled to said third input of said second gate means, the set input of said flip-flop circuit being connected to the output of said second gate means and the reset input of said flip-flop circuit being connected to the output of said first gate means.

3. A frame synchronization system is claimed in claim 2, further comprising time delay means, and wherein the output of said flip-flop circuit means is coupled to said third input of said second gate means via said time delay means.

4. A method of synchronizing the frame of a digital signal transmission, comprising the steps of detecting the synchronous pattern of a digital signal pulse train;

distributing the digital signal pulse train under the control of the detected synchronous pattern;

forcibly resetting the frame of the distributed digital signal pulses when the frame of the digital signal pulse train is nonsynchronous;

resetting the frame of the distributed digital signal pulses under clock control at least once per frame of the digital signal train; and prohibiting further forcible resetting of the frame of the distributed digital signal pulses until the next succeeding frame of the digital signal pulse train.

5. A method of synchronizing the frame of a digital signal transmission as claimed in claim 4, further comprising a determining when the detected synchronous pattern is in a time slot preceding the synchronous position and forcibly resetting the frame of the distributed digital signal pulses.

6. A method of synchronizing the frame of a digital signal transmission as claimed in claim 4, further comprising determining when the detected synchronous pattern is in a time slot subsequent to its synchronous position and forcibly resetting the frame of the distributed digital signal pulses.